Oct. 14, 1969  M. F. ASHLEY  3,471,946
GLOBE MAP DEVICE

Filed Feb. 8, 1967  2 Sheets-Sheet 1

Oct. 14, 1969  M. F. ASHLEY  3,471,946
GLOBE MAP DEVICE
Filed Feb. 8, 1967  2 Sheets-Sheet 2 ately on the inner and outer surfaces of said shell, the flexibility of said material being such that said shell may be bodily everted to display either map portion on a convex globular surface.

United States Patent Office 3,471,946
Patented Oct. 14, 1969

3,471,946
GLOBE MAP DEVICE
Merwin F. Ashley, 4 Monadnock Road,
Arlington, Mass. 02174
Continuation-in-part of application Ser. No. 497,341,
Oct. 18, 1965. This application Feb. 8, 1967, Ser.
No. 628,190
Int. Cl. G09b 27/00, 27/08
U.S. Cl. 35—46
2 Claims

ABSTRACT OF THE DISCLOSURE

A geography teaching aid in the form of a substantially hemispherical, single-walled shell having complementary portions of a terrestrial globe map mounted on its respective inner and outer sides. The shell is formed from a self-supporting, flexible material and is readily eversible to display either map portion on a convex surface.

---

This application is a continuation-in-part of my co-pending application Ser. No. 497,341, filed Oct. 18, 1965, entitled Globe Map Device. The invention disclosed herein relates to globe maps and provides an improved device for teaching geography to children of grammar school age.

As is well-known, maps rendered in a single plane, while suitable to represent small areas, are unsatisfactory for large areas because of the earth's curvature, and where flat maps are made of large terrestrial areas, as in the many popular projections, the consequent distortion gives the student an inaccurate notion of the earth's land areas. Unfortunately, good globe maps as heretofore constructed command prices that are often beyond the means of a young student, are quite fragile and are awkward to transport. As distinguished from such globes, there is provided by the present invention a cheap, durable, collapsible globe map that a student may carry in his pocket.

In accordance with the present invention separate complementary half portions of a complete globe map are respectively mounted on the inner and outer surfaces of a substantially hemispherical single-walled, seamless shell molded of soft rubber, plastic, or other suitable self-supporting material of sufficient flexibility so that the shell may be bodily everted to display either map portion on a convex globular surface. Thus made, the shell may be collapsed and rolled-up for temporary packaging and this may be facilitated by forming a small central aperture through the shell to accommodate the folds where they are most tight. Preferably the shell is of slightly less depth than its radius of curvature to facilitate molding in manufacture and the stacking of a plurality of the devices in nested relation for storage or shipment.

Referring to the drawings which form a part of this specification, it will be understood that the globe map representations, as distinguished from the physical aspects of the device, cannot be accurately delineated on a plane surface and are therefore merely illustrative.

Figure 1:
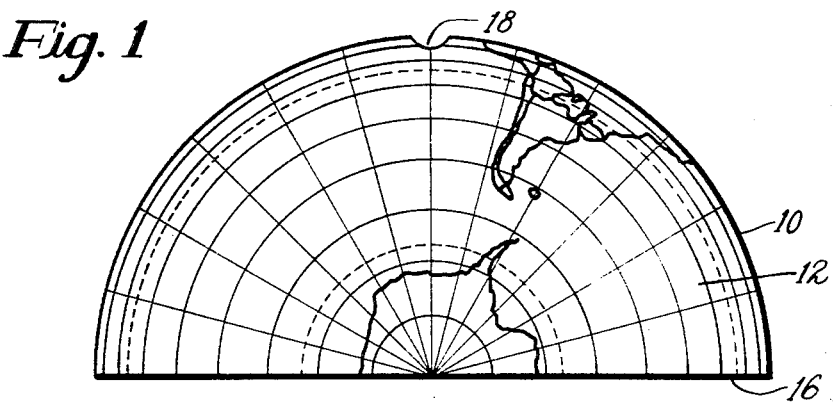
FIG. 1 is a front elevational view of a device embodying the invention.
Figure 2:
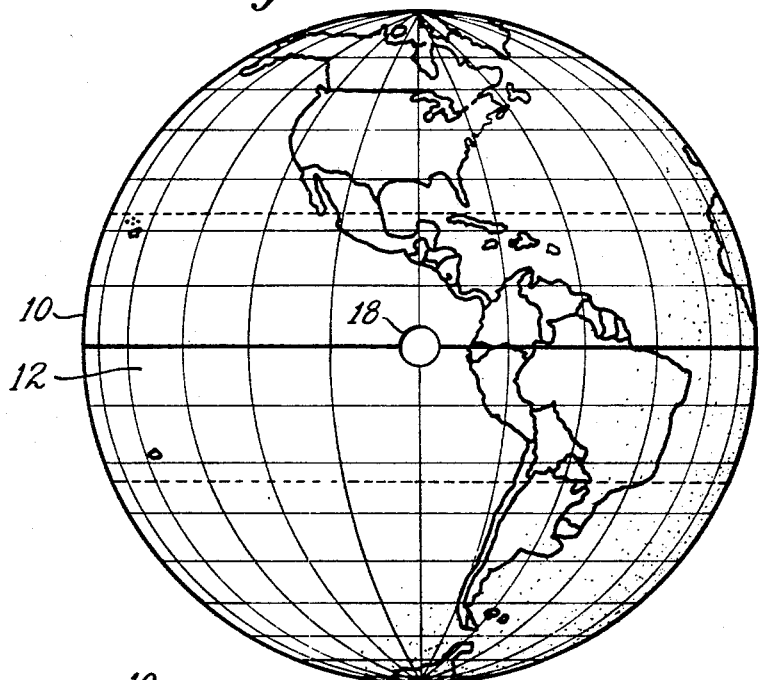
FIG. 2 is a plan view thereof, the map representations showing the Western hemisphere.

As illustrated, the device comprises an approximately hemispherical shell 10 having a thin wall to provide substantially commensurate inner and outer display surfaces 12 and 14 respectively carrying complemental half portions of a complete terrestrial globe map. As shown, the outer convex surface 12 carries a representation of the Western hemisphere and the inner concave surface 14 carries a representation of the Eastern hemisphere, the edge of the circular rim portion 16 of the shell coinciding with the meridian of Greenwich (0°) and the International Date Line (180°). However, as will be readily understood the half portions of the map may be divisions along other meridians of longitude or opposite sides of the shell may carry maps of the northern and southern hemispheres, in which latter instance the edge or rim of the shell will coincide with the equator. The circular rim 16 of the shell serves as a base for supporting the device upon a desk, table, or other plane surface where it may be turned about for reference or study. The shell being readily eversible, either map portion may be presented familiarly upon a convex surface of the device.

The shell 10 is preferably molded from a homogeneous mass of natural or synthetic rubber, plastic or other suitable flexible material as a single solid wall of sufficient thickness to render the device self supporting and of sufficient elasticity and resilience to permit eversion and folding of the shell without fracturing its map supporting surfaces. Rubber is well suited for the purpose as are vinyl polymer compositions provided they are so compounded and treated as to preserve the dimensional stability of the device. The map portions may be mounted or printed on the shell by any of several well-known graphic arts procedures which constitute no part of the present invention. For example, they may be lithographed directly upon the display surfaces 12 and 14, or they may be applied as decalcomanias, or by the well-known silk screen method of printing, photographically, or by adhesively laminating thin segments of paper or sheet plastic having the map lithographed or printed thereon as in the usual practice of constructing globe maps on spherical paperboard bases.

Figure 3:
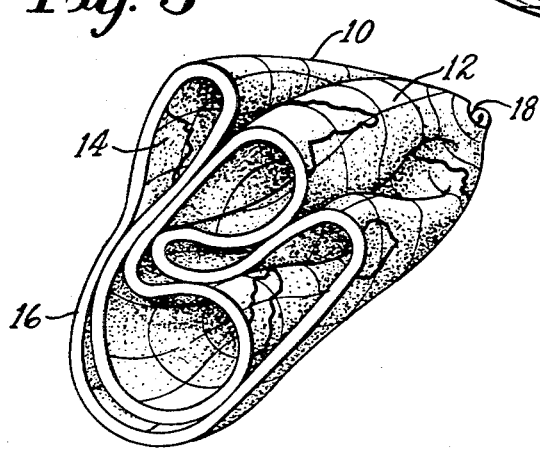
FIG. 3 is a perspective view showing the device collapsed and folded for convenient transportation.
Figure 4:
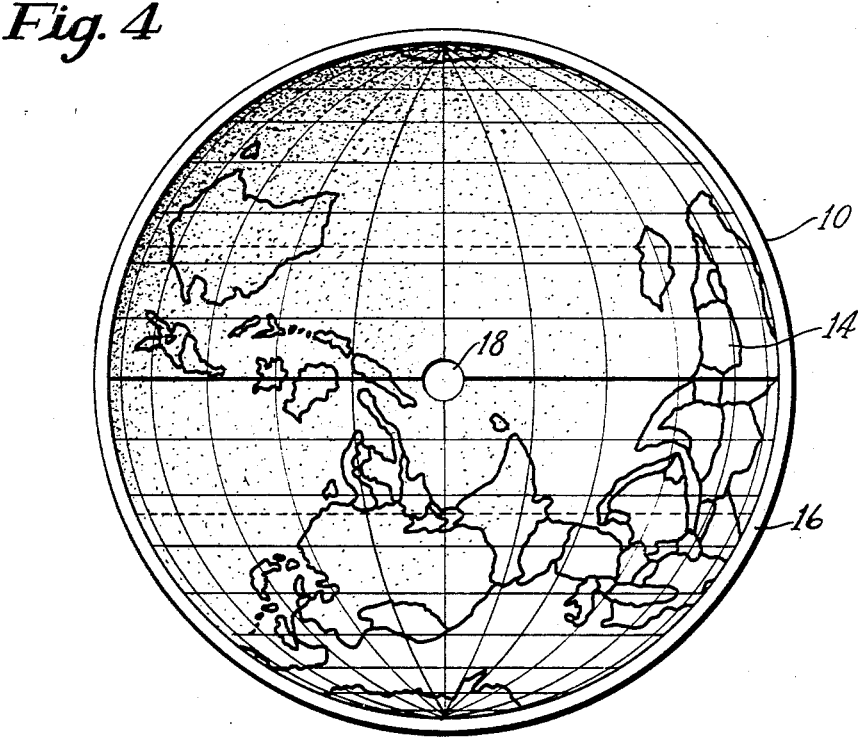
FIG. 4 is a bottom view of the device displaying a map of the Eastern hemisphere on its concave surface.
Figure 5:
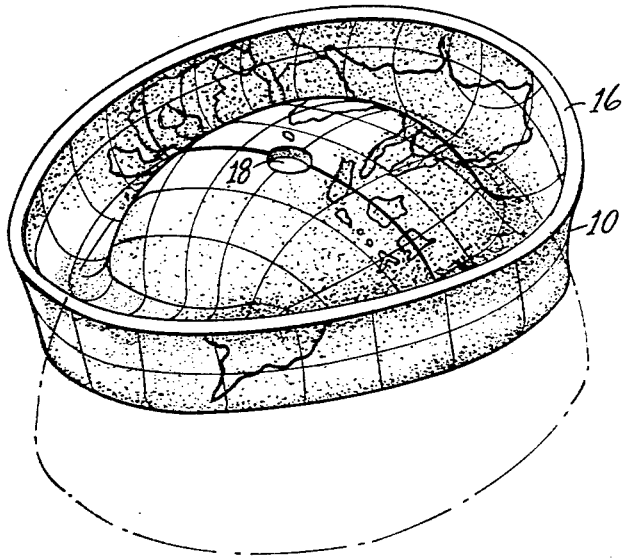
FIG. 5 is a perspective view showing the device in the process of being everted to display the Eastern hemisphere on a convex surface.

As illustrated in FIG. 3, the device may be readily collapsed and folded in the manner of rolling up a soft felt hat, thus packaging it so compactly that a boy can carry it in his pocket. To facilitate rolling the device in this manner a hole 18 may be advantageously formed completely through the single-wall of the device at its center better to accommodate the folds where they are most tight.

When molded, as of rubber or plastic material, the shell 10 is preferably not formed as a perfect hemisphere but is of slightly less depth than its radius of curvature. In other words the shell is slightly more shallow than a true hemisphere. While this departure from a true hemispherical shape facilitates withdrawal of the shell from its mold in manufacture the departure is not sufficient to require any material distortion of the map to be mounted thereon. Also, for purposes of the present invention, it permits a plurality of the devices to be more readily nested together for transportation or storage.

While I have disclosed a preferred embodiment of my invention, I wish it understood that I do not intend to be restricted solely thereto, but that I do intend to include all embodiments thereof which would be apparent to one skilled in the art and which come within the spirit and scope of my invention.

Having thus described my invention, I claim:

1. As an article of manufacture, a device for teaching geography comprising a single-walled shell of substantially hemispherical shape molded of flexible self-supporting material and providing substantially commensurate inner and outer display surfaces, separate complemental half portions of a terrestrial globe map carried respectively upon said inner and outer surfaces, said shell being bodily eversible to display either of said map portions upon a convex globular surface of the device, the rim of said shell forming a base for supporting the device upon a table surface.

2. An article of manufacture as defined in claim 1 in which the shell has a central hole formed completely therethrough to facilitate folding of the device for packaging.

References Cited

UNITED STATES PATENTS

| | | | |
|---|---|---|---|
| 1,538,847 | 5/1925 | Wheeler. | |
| 2,135,287 | 11/1938 | Houston | 35—47 X |
| 2,621,334 | 12/1952 | O'Hare | 2—146 |
| 2,635,358 | 4/1953 | George | 35—46 |

JEROME SCHNALL, Primary Examiner